(12) United States Patent
Vaccaro

(10) Patent No.: US 10,090,661 B2
(45) Date of Patent: Oct. 2, 2018

(54) SEALING BOOT FOR ELECTRICAL INTERCONNECTION

(71) Applicant: CommScope Technologies LLC, Hickory, NC (US)

(72) Inventor: Ronald A. Vaccaro, Shorewood, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/291,292

(22) Filed: Oct. 12, 2016

(65) Prior Publication Data
US 2017/0104323 A1    Apr. 13, 2017

Related U.S. Application Data

(60) Provisional application No. 62/240,263, filed on Oct. 12, 2015.

(51) Int. Cl.
*H02G 15/00* (2006.01)
*H02G 15/04* (2006.01)
*F16J 15/02* (2006.01)

(52) U.S. Cl.
CPC .......... *H02G 15/043* (2013.01); *F16J 15/025* (2013.01)

(58) Field of Classification Search
CPC ............................... H02G 15/04; H02G 15/46
USPC .................. 174/74 R, 77 R, 74 A, 84 R
See application file for complete search history.

(56) References Cited

U.S. PATENT DOCUMENTS

| 5,886,294 A * | 3/1999 | Scrimpshire ......... G02B 6/3887 174/359 |
| 6,429,373 B1 * | 8/2002 | Scrimpshire ......... H02G 15/013 174/74 A |
| 7,090,516 B2 * | 8/2006 | Khemakhem ............ H01R 4/70 439/135 |
| 7,838,775 B2 | 11/2010 | Montena |
| 2006/0014427 A1 | 1/2006 | Islam et al. |
| 2006/0199431 A1 * | 9/2006 | Paynter ................ H01R 9/0524 439/578 |
| 2008/0132104 A1 | 6/2008 | Iwase et al. |

(Continued)

FOREIGN PATENT DOCUMENTS

KR    10-2010-0010333 A    2/2010

OTHER PUBLICATIONS

U.S. Appl. No. 13/646,952, filed Oct. 3, 2012, Ronald A. Vaccaro.

(Continued)

*Primary Examiner* — William H Mayo, III
(74) *Attorney, Agent, or Firm* — Myers Bigel, P.A.

(57) ABSTRACT

A sealing boot for protecting an electrical interconnection includes: a main body having a cavity configured to house an interconnection of two electrical connectors; and a neck merging with one end of the main body and having a cylindrical inner surface that defines a bore that is continuous with the cavity of the main body, the inner surface having an inner diameter that is less than an inner diameter of the cavity of the main body. The inner surface of the neck includes a helical projection comprising a main artery and two tributaries, the tributaries each intersecting a section of the main artery at one end and merging with an end of the main artery at an opposite end.

8 Claims, 6 Drawing Sheets

(56) References Cited

U.S. PATENT DOCUMENTS

| | | | |
|---|---|---|---|
| 2010/0248533 A1* | 9/2010 | Montena | H01R 13/5213 |
| | | | 439/521 |
| 2010/0273340 A1* | 10/2010 | Clausen | H01R 24/564 |
| | | | 439/277 |
| 2011/0011484 A1* | 1/2011 | Evoniuk | H02G 15/1833 |
| | | | 138/177 |
| 2012/0190234 A1* | 7/2012 | Montena | H01R 13/5213 |
| | | | 439/521 |
| 2013/0143439 A1* | 6/2013 | Nugent | H01R 9/0518 |
| | | | 439/585 |
| 2013/0164962 A1* | 6/2013 | Shaw | H01R 13/622 |
| | | | 439/320 |
| 2013/0171869 A1* | 7/2013 | Chastain | H01R 13/512 |
| | | | 439/583 |
| 2014/0045356 A1 | 2/2014 | Natoli et al. | |
| 2014/0045357 A1* | 2/2014 | Nugent | H01R 13/5221 |
| | | | 439/275 |
| 2014/0097022 A1* | 4/2014 | Vaccaro | B29C 45/261 |
| | | | 174/77 R |

OTHER PUBLICATIONS

U.S. Appl. No. 13/938,475, filed Jul. 10, 2013, Ronald A. Vaccaro.
U.S. Appl. No. 14/245,443, filed Apr. 4, 2015, Ronald A. Vaccaro.
International Search Report and Written Opinion Corresponding to International Application No. PCT/US2016/056369; dated Jan. 12, 2017; 12 Pages.
Notification Concerning Transmittal of International Preliminary Report on Patentability dated Apr. 26, 2018.

* cited by examiner

SEALING BOOT FOR ELECTRICAL INTERCONNECTION

RELATED APPLICATION

The present application claims priority from and the benefit of U.S. Provisional Patent Application No. 62/240,263, filed Oct. 12, 2015, the disclosure of which is hereby incorporated herein in its entirety.

FIELD OF THE INVENTION

The present invention relates generally to a device for environmentally sealing and securing the interconnection between electrical cables.

BACKGROUND

Interconnections between electrical connectors, such as the interconnection between two cables or a cable and a piece of electronic equipment, may be subject to degradation from environmental factors such as moisture, vibration and repeated expansion and contraction from daily temperature changes. Outer sealing enclosures that surround or enclose an electrical interconnection have been used to protect such interconnections. Enclosures often apply rigid clamshell configurations that, once closed, may be difficult to open, especially when installed in exposed or remote locations, such as atop radio towers; gaskets or gel seals may be applied at the enclosure ends and/or along a sealing perimeter of the shell.

Elastomeric sealing covers for protecting electrical interconnections are also known. Elastic sealing covers can be advantageous because they may be more easily installed over the typically uneven contours of an electrical interconnection. Exemplary configurations are described in U.S. Pat. No. 6,429,373 to Scrimpshire and U.S. patent application Ser. No. 13/646,952, filed Oct. 8, 2012; U.S. Ser. No. 13/938,475, filed Jul. 10, 2013; and U.S. Ser. No. 14/245,443, filed Apr. 4, 2015, the disclosures of which are hereby incorporated by reference herein.

The elastomeric sealing covers discussed above typically have a neck section that seals snugly against the jacket of a cable attached to a connector that resides within the cavity of the cover. Often the neck section has a smooth inner diameter, which provides maximum contact for sealing purposes, but which makes the neck section more difficult to slide relative to the cable jacket during installation. U.S. Pat. No. 7,838,775 to Montena (also incorporated herein by reference) proposes a cover that has annular grooves on the inner surface of the neck section to facilitate installation; however, this configuration can make the neck section more susceptible to moisture ingress, particularly if the cable has a corrugated outer conductor, as the presence of the corrugations can form shallow ridges and valleys in the jacket of the cable. As such, it may be desirable to provide a sealing cover having an alternative configuration.

SUMMARY

As a first aspect, embodiments of the invention are directed to a sealing boot for protecting an electrical interconnection, comprising: a main body having a cavity configured to house an interconnection of two electrical connectors; and a neck merging with one end of the main body and having a cylindrical inner surface that defines a bore that is continuous with the cavity of the main body, the inner surface having an inner diameter that is less than an inner diameter of the cavity of the main body. The inner surface of the neck includes a helical feature comprising a main artery and two tributaries. The tributaries each intersect a section of the main artery at one end and merge with an end of the main artery at an opposite end.

As a second aspect, embodiments of the invention are directed to a sealing boot for protecting an electrical interconnection, comprising: a main body having a cavity configured to house an interconnection of two electrical connectors; and a neck merging with one end of the main body and having a cylindrical inner surface that defines a bore that is continuous with the cavity of the main body, the inner surface having an inner diameter that is less than an inner diameter of the cavity of the main body. The inner surface of the neck includes a helical feature having first and second ends, wherein the first and second ends are spaced from a free end of the neck.

As a third aspect, embodiments of the invention are directed to an interconnection assembly, comprising: (a) a cable having a helically corrugated outer conductor, the outer conductor defining a helix having a first rotative direction; and (b) a sealing boot. The sealing boot comprises: a main body having a cavity configured to house an interconnection of two electrical connectors; and a neck merging with one end of the main body and having a cylindrical inner surface that defines a bore that is continuous with the cavity of the main body, the inner surface having an inner diameter that is less than an inner diameter of the cavity of the main body. The inner surface of the neck includes a helical feature that defines a helix having a second rotative direction that is opposite the first rotative direction. The inner surface of the neck grips the cable.

BRIEF DESCRIPTION OF THE FIGURES

FIG. 7A shows the grooves and corrugations "in phase", and FIG. 7B shows the groove and corrugations out of phase.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used herein is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
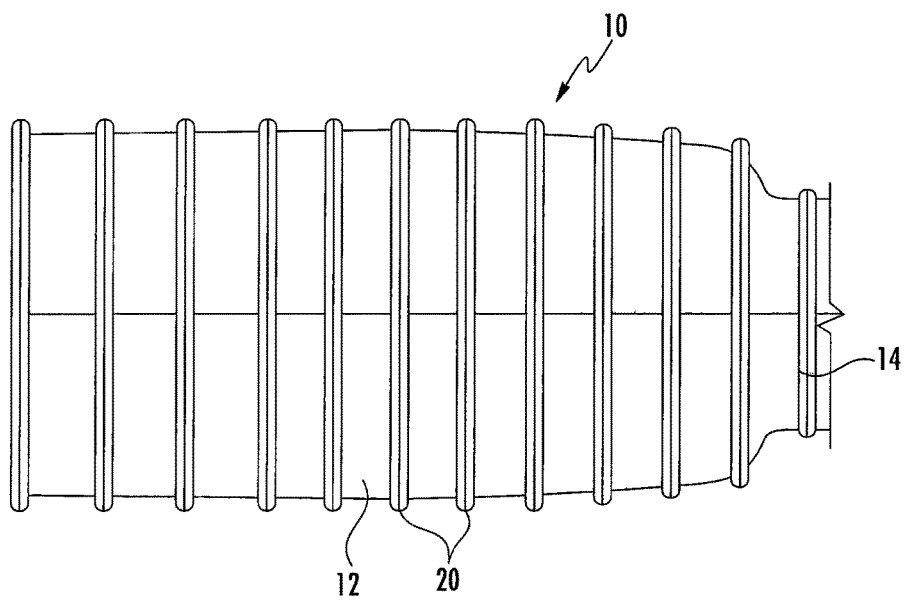
FIG. 1 is a front view of a cover boot for an electrical interconnection according to embodiments of the invention.
Figure 2:
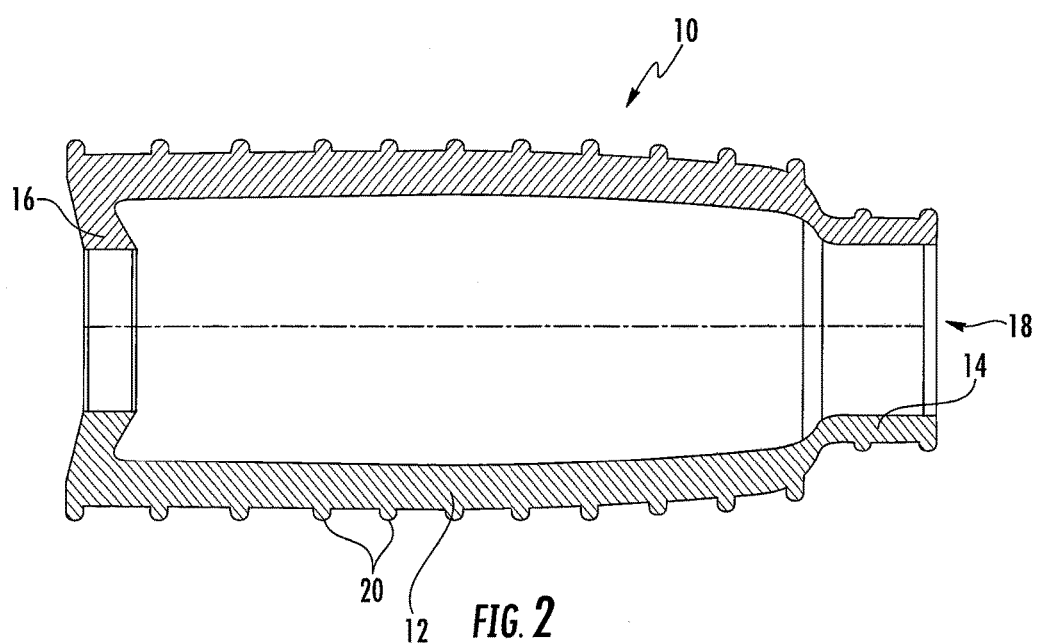
FIG. 2 is a front section view of the cover boot of FIG. 1.

Referring now to the figures, a cover boot for an interconnection of coaxial connectors, designated broadly at 10, is illustrated in FIGS. 1 and 2. The boot 10 includes a generally cylindrical main section 12 that is tapered on one end. A generally cylindrical cable neck 14 is somewhat smaller in diameter than the main section 12 and extends from the tapered end of the main section 12. The opposite end of the main section 12 merges with a collar 16 that extends radially inwardly. The resulting structure is hollow and defines a continuous bore 18 that passes through each of the substantially coaxial sections 12, 14, 16. Annular ribs 20 are formed on the outer surface of the boot 10 to enhance an installer's grip.

The boot 10 may be formed of any number of materials, but is typically formed of an elastomeric material, such as rubber, that can recover to its original shape after significant deformation. The boot 10 is typically formed as a unitary member, and in particular may be formed via injection molding.

Figure 3:
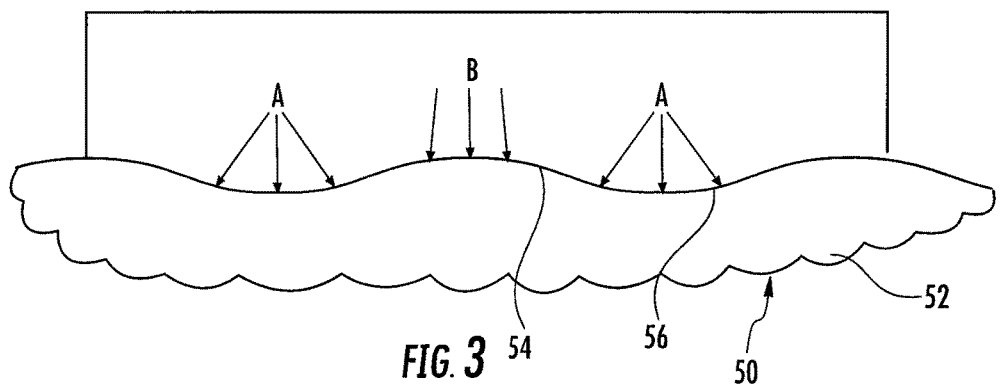
FIG. 3 is a greatly enlarged view of a neck section of a cover boot and the surface of the jacket of a coaxial cable with a corrugated outer conductor.
Figure 4:
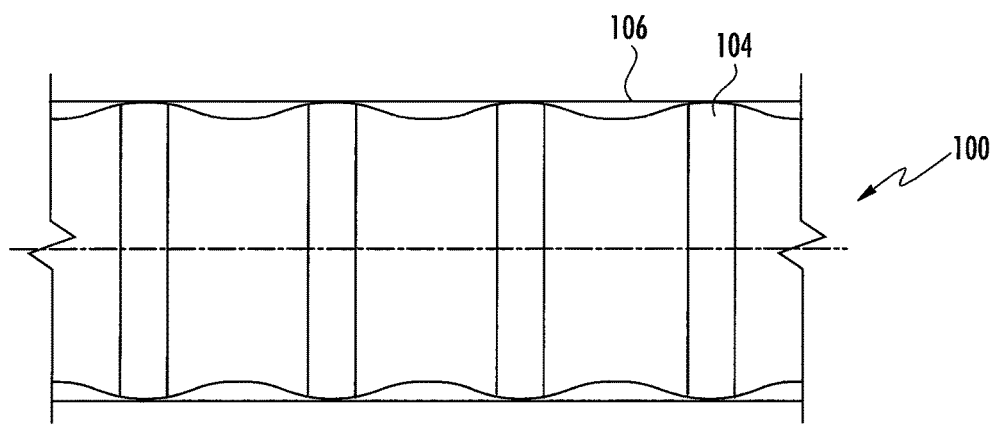
FIG. 4 is a front view of a coaxial cable having an annularly corrugated outer conductor.
Figure 5:
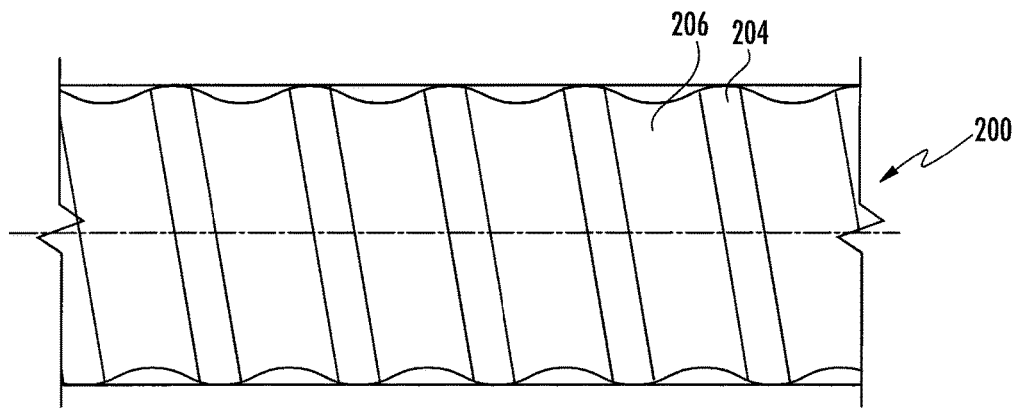
FIG. 5 is a front view of a coaxial cable having a helically corrugated outer conductor.

As discussed above, when a coaxial cable has a corrugated outer conductor, the overlying jacket may have shallow ridges and valleys formed by the crests and roots of the corrugations. This structure can be seen in FIG. 3, in which a cable 50 has a jacket 52 with projecting ridges 54 and recessed valleys 56 formed by the corrugations of the underlying outer conductor. The outer conductor of a coaxial cable may have annular or helical corrugations: cable 100 of FIG. 4 has annular corrugations that create annular ridges 104 and valleys 106, whereas cable 200 shown in FIG. 5 has an outer conductor with helical corrugations that create helical ridges 204 and valleys 206 in the jacket 202.

Figure 6:
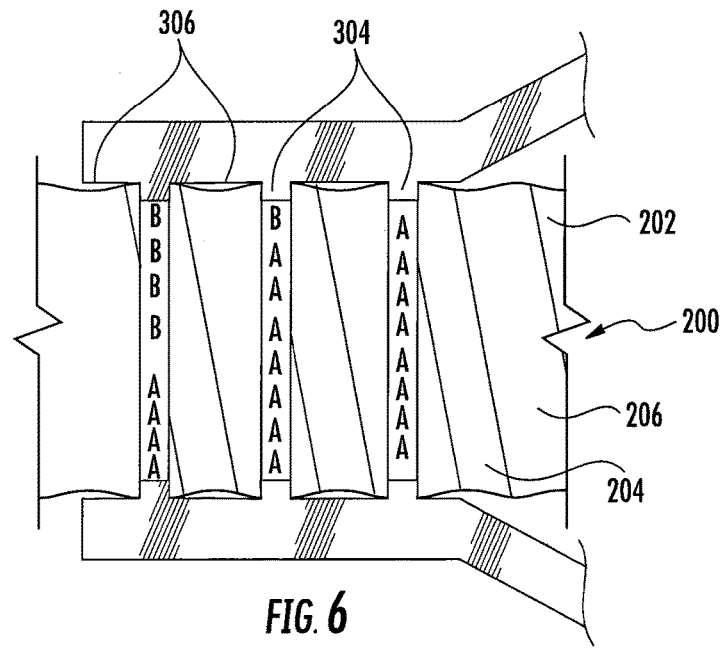
FIG. 6 is a front partial section view of a cover boot with annular grooves in the neck section inserted over a helically corrugated coaxial cable as in FIG. 5.

When annular grooves and projections are included in the portion of a sealing boot (such as the neck 14 discussed above) that seals a cable in order to ease sliding of the boot along the cable jacket, the interaction of the helical ridges 204 and valleys 206 in the jacket 202 and the projections and grooves of the boot can create voids between the inner surface of the neck 14 and the jacket 202. As can be seen in FIG. 6, a seal (denoted "B") is formed wherever a projection 304 of a boot 300 crosses a ridge 204, as such contact compresses the projection 304 and provides a seal. However, voids (denoted "A") are formed wherever a projection 304 (or a groove 306) spans a valley 206 between two ridges 204. The voids A can create a path through which moisture can seep into the interconnection within the boot 300.

Figures 7A, 7B:
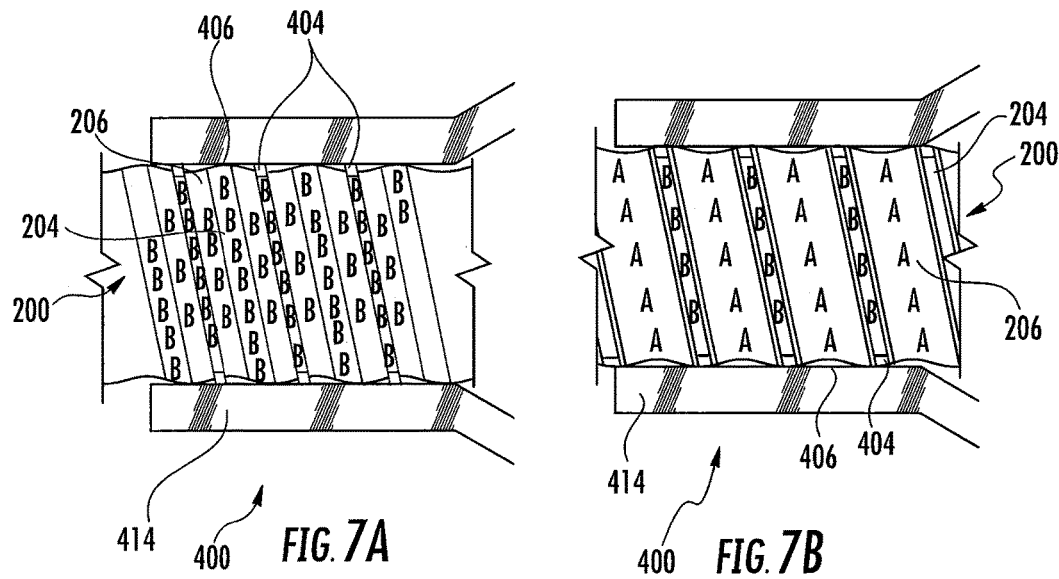
FIGS. 7A and 7B are front partial section views of a cover boot with helical grooves in the neck section inserted over a helically corrugated coaxial cable as in FIG. 5, wherein both the helical grooves of the neck and the corrugations of the coaxial cable follow a "right-handed" helix.

Such voids "A" can be even more pronounced when, as shown in FIGS. 7A and 7B, the protections 404 and grooves 406 in the inner surface of the neck 414 of a boot 400 are helical in the same direction as the helix of the cable 200 (e.g., both the cable and the grooves/projections in the boot have a right-handed thread). There should be no voids A when the projections 404 and recesses 406 of the boot 400 and the ridges 204 and the valleys 206 of the cable 200 are "in phase" (FIG. 7A), but significant voids A are present when the projections/grooves 404/406 and the ridges/valleys 204/206 are out of phase, which can easily occur when the boot 400 is slipped onto the cable 200. Moreover, voids A created by an out of phase cable helix/projection interface are also helical and can create a spiral pathway for moisture to reach the interconnection protected by the boot 400.

Figure 8:
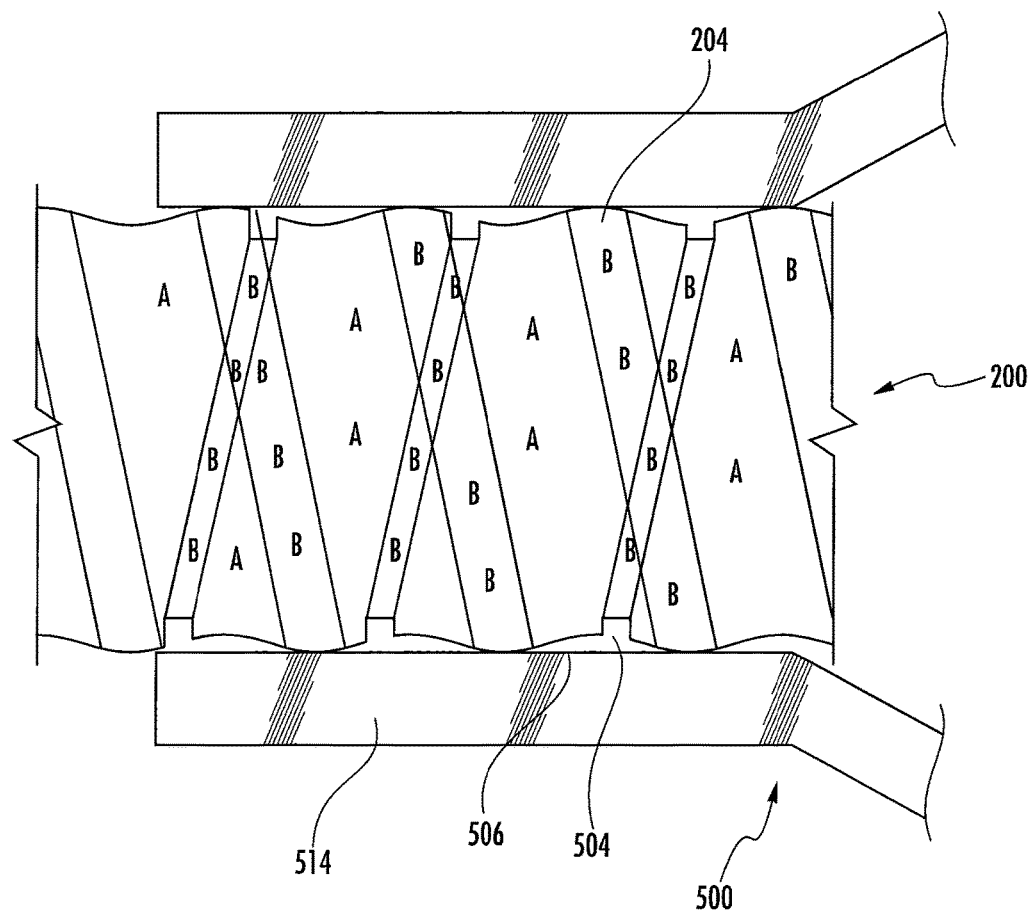
FIG. 8 is a front partial section view of the neck section of a cover boot according to embodiments of the invention inserted over a helically corrugated cable as in FIG. 5.

A solution to the void problem is offered by the boot 500 shown in FIG. 8, which has a projection 504 that is routed in the opposite direction of the helix of the cable 200 (e.g., the cable 200 has a right-handed helix and the projection 504 follows a left-handed helix). As can be seen in FIG. 8, an oppositely-directed helical projection 504 cannot be positioned to be out of phase with the helix of the cable 200. Thus, many high compression areas B between the projection 504 and the cable 200 can be generated, as can high compression areas B between the ridges 204 of the cable 200 and the recesses 506 of the boot 500. Moreover, these high compression areas B intersect one another, with the result that potential spiral leak paths are blocked as long as the helix of the projection 504 does not extend for the entire length of the neck 514 of the boot 500.

Figure 9A:
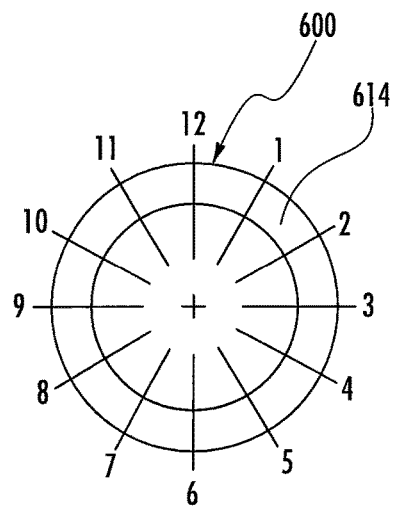
FIGS. 9A and 9B are schematic diagrams illustrating the cylindrical coordinate system used in FIGS. 10 and 11.
Figure 9B:
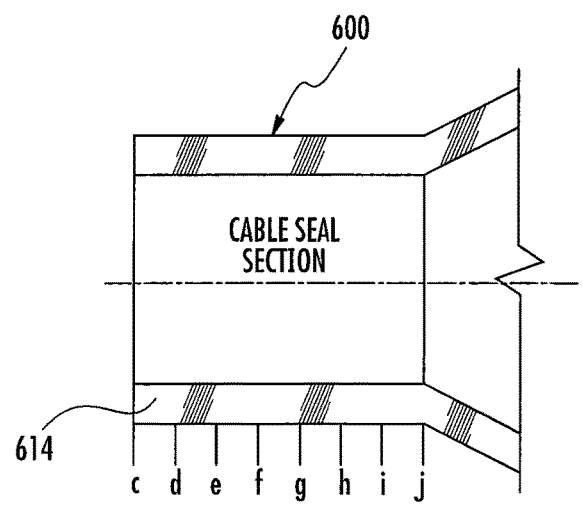
Figure 10:
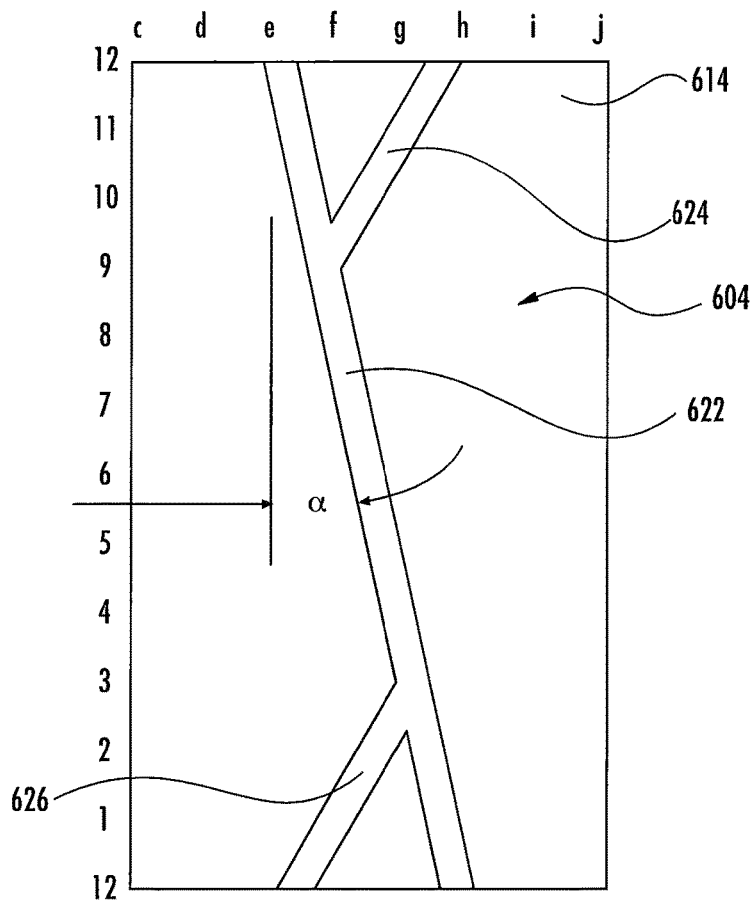
FIG. 10 is a layflat view of a groove pattern for the neck section of a cover boot according to embodiments of the invention.

Referring now to FIGS. 9A, 9B and 10, an exemplary pattern for a projection 604 for a boot 600 is shown therein. By way of explanation, FIGS. 9A and 9B establish a cylindrical coordinate system for the neck 614 of the boot 600, with axial length along the neck 614 being denoted "c-j" and angular position on the neck 614 denoted "1-12" in the manner of a clock face. FIG. 10 illustrates the inner surface of the neck 614 in "layflat" form as it would be unfurled or unwrapped so that it can be shown in two dimensions. As can be seen in FIG. 10, the projection 604 includes a helical main artery 622 that is routed 360 degrees about the inner surface of the neck 614 as it traverses axially from "e" to "h". In the illustrated embodiment, the main artery 622 has a "left-handed" helix angle based on the assumption that a cable that the boot 600 would seal would have a right-handed helix. At each end, the main artery 622 meets a respective tributary 624, 626. The tributary 624 extends between the "h" end of the artery 622 toward an intermediate portion of the artery 622 relatively near the "e" end of the artery 622 (i.e., near position "9f"), and the tributary 626 extends between the "e" end of the artery 622 toward an intermediate portion of the artery 622 near the "h" end of the artery 622 (near position "3g"). Thus, the resulting projection 604 describes, in three-dimensions, a ring with a diamond-shaped "loop" over approximately half of the diameter of the ring. The helix angle α of the main artery 622 may vary, but typically would be between about 5 and 30 degrees.

Figure 11:
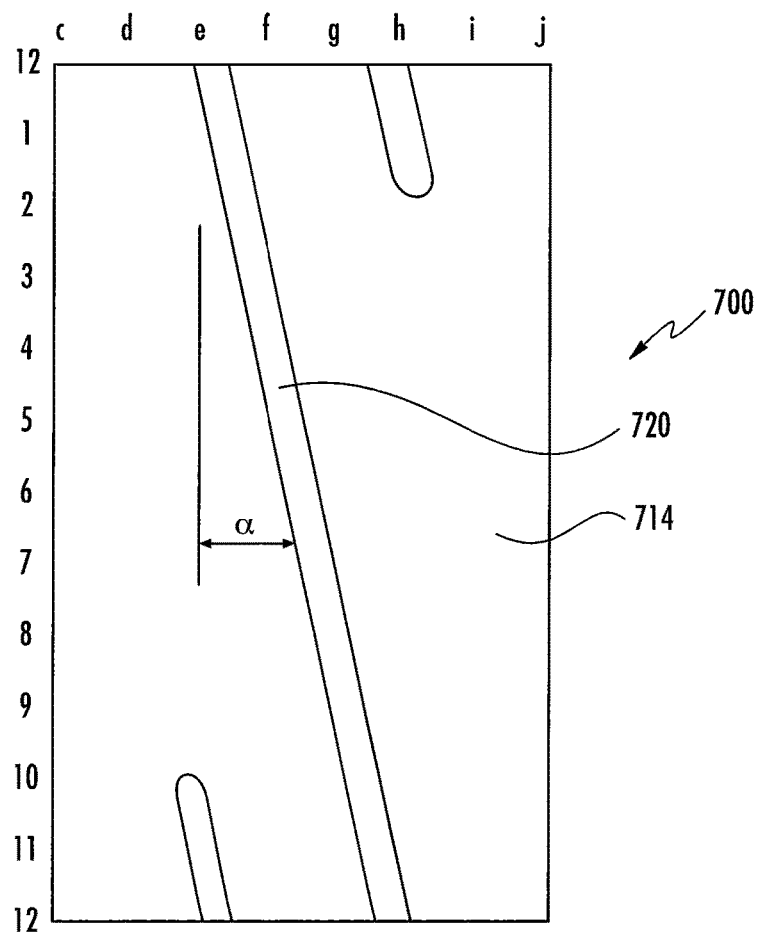
FIG. 11 is a layflat view of a groove pattern for the neck section of a cover boot according to alternative embodiments of the invention.

Referring now to FIG. 11, another projection 720 for a boot 700 is shown therein in layflat form. The projection 720 comprises a single continuous left-handed helix that extends for approximately 480 degrees along the inner surface of the neck 714 between the "e" and "h" positions. The helix angle α of the projection 720 may vary, but may typically be between about 5 and 30 degrees. The ends of the projection 720 terminate well short of the end of the neck 714.

Both of the projections 620, 720 can facilitate the installation of the boots 600, 700 onto a cable by reducing the friction between the inner surface of the neck 614, 714 of the boot and the cable jacket. However, the projections 620, 720 can also prevent moisture from seeping into the interconnection residing in the boot because, as oppositely-directed helices, they seal voids in helically corrugated cables as described above.

Figure 12A:
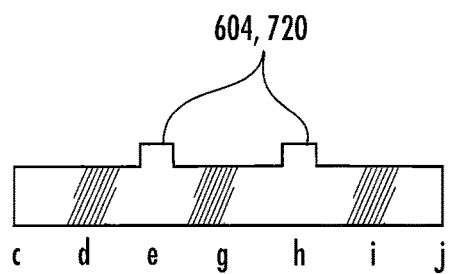
FIGS. 12A and 12B are greatly enlarged front section views of exemplary features (grooves and projections) that may be employed in the patterns shown in FIGS. 10 and 11.
Figure 12B:
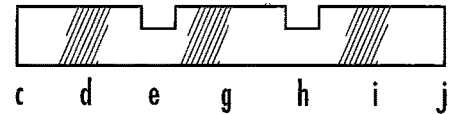

Those of skill in this art will appreciate that, although relatively narrow projections 620, 720 are shown herein separated by wider recesses (see FIG. 12A), the inner surface can also be constructed such that the projections are relatively wider and are separated by relatively narrower recesses/grooves (see FIG. 12B), or the projections/recesses may be of similar width. Thus, either of the features of the inner surface of the neck (i.e., projections or recesses) may follow the paths of the projections discussed above.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A sealing boot for protecting an electrical interconnection, comprising:
   a main body having a cavity configured to house an interconnection of two electrical connectors; and
   a neck merging with one end of the main body and having a cylindrical inner surface that defines a bore that is continuous with the cavity of the main body, the inner surface having an inner diameter that is less than an inner diameter of the cavity of the main body;
   wherein the inner surface of the neck includes a helical feature comprising a main artery and two tributaries, the tributaries each intersecting a section of the main artery at one end and merging with an end of the main artery at an opposite end.

2. The sealing boot defined in claim 1, wherein the cavity of the main body is tapered at an end merging with the neck.

3. The sealing boot defined in claim 1, further comprising a radially-inwardly-extending collar at an end of the main body opposite the neck.

4. The sealing boot defined in claim 1, wherein the helical feature defines a helix angle of be between about 5 and 30 degrees.

5. The sealing boot defined in claim 1 in combination with a cable terminated with a connector that resides in the cavity, wherein the neck of the sealing boot grips the cable.

6. The combination defined in claim 5, wherein the cable includes a helically corrugated outer conductor, the helix of the outer conductor defining a first rotative direction, and where the helical projection of the neck defines a second, opposite rotative direction.

7. The combination defined in claim 5, wherein the connector is attached to a second connector mounted to a piece of electrical equipment via a shank, and wherein the collar grips the shank.

8. The sealing boot defined in claim 1, wherein the helical feature is a helical projection.

\* \* \* \* \*

UNITED STATES PATENT AND TRADEMARK OFFICE
CERTIFICATE OF CORRECTION

PATENT NO. : 10,090,661 B2
APPLICATION NO. : 15/291292
DATED : October 2, 2018
INVENTOR(S) : Ronald A. Vaccaro Page 1 of 1

It is certified that error appears in the above-identified patent and that said Letters Patent is hereby corrected as shown below:

In the Claims

Column 6, Claim 4, Line 23: Please correct "angle of be between" to read -- angle of between --

Signed and Sealed this
Eighth Day of January, 2019

Andrei Iancu
*Director of the United States Patent and Trademark Office*